United States Patent
Dean et al.

(10) Patent No.: US 10,152,520 B1
(45) Date of Patent: *Dec. 11, 2018

(54) RANKING DOCUMENTS BASED ON USER BEHAVIOR AND/OR FEATURE DATA

(71) Applicant: Google Inc., Mountain View, CA (US)

(72) Inventors: Jeffrey A. Dean, Palo Alto, CA (US); Corin Anderson, Mountain View, CA (US); Alexis Battle, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/085,826

(22) Filed: Mar. 30, 2016

Related U.S. Application Data (63) Continuation of application No. 13/347,472, filed on Jan. 10, 2012, now Pat. No. 9,305,099, which is a continuation of application No. 12/728,015, filed on Mar. 19, 2010, now Pat. No. 8,117,209, which is a continuation of application No. 10/869,057, filed on Jun. 17, 2004, now Pat. No. 7,716,225.

(51) Int. Cl.
*G06F 17/30* (2006.01)
*G06F 17/22* (2006.01)

(52) U.S. Cl.
CPC ...... *G06F 17/3053* (2013.01); *G06F 17/2235* (2013.01); *G06F 17/30864* (2013.01)

(58) Field of Classification Search
CPC ......... G06F 17/30728; G06F 17/30864; G06F 17/30867; G06F 17/30687; Y10S 707/99935; Y10S 707/99937; Y10S 707/99933; Y10S 707/99943
See application file for complete search history.

(56) References Cited

U.S. PATENT DOCUMENTS

| | | | |
|---|---|---|---|
| 5,446,891 A * | 8/1995 | Kaplan | G06F 17/30014 |
| 5,897,627 A | 4/1999 | Leivian et al. | |
| 6,006,222 A | 12/1999 | Culliss | |
| 6,014,665 A | 1/2000 | Culliss | |
| 6,055,569 A | 4/2000 | O'Brien et al. | |
| 6,078,916 A | 6/2000 | Culliss | |
| 6,088,692 A | 7/2000 | Driscoll | |
| 6,144,944 A | 11/2000 | Kurtzman et al. | |
| 6,182,068 B1 | 1/2001 | Culiss | |
| 6,285,999 B1 * | 9/2001 | Page | G06F 17/30728 |
| 6,311,175 B1 | 10/2001 | Adriaans | |
| 6,397,211 B1 | 5/2002 | Cooper | |
| 6,463,430 B1 | 10/2002 | Brady et al. | |
| 6,523,020 B1 | 2/2003 | Weiss | |

(Continued)

OTHER PUBLICATIONS

Oztekin et al. "Usage Aware PageRank," http://www.cs.umn.edu/research/technical_reports/view/03-010, 215/2003.

(Continued)

*Primary Examiner* — Shew Fen Lin
(74) *Attorney, Agent, or Firm* — Middleton Reutlinger (57) ABSTRACT

A system generates a model based on feature data relating to different features of a link from a linking document to a linked document and user behavior data relating to navigational actions associated with the link. The system also assigns a rank to a document based on the model.

20 Claims, 7 Drawing Sheets

(56) References Cited

U.S. PATENT DOCUMENTS

| | | | |
|---|---|---|---|
| 6,539,377 | B1 | 3/2003 | Culliss |
| 6,546,388 | B1 | 4/2003 | Edlund et al. |
| 6,546,389 | B1 | 4/2003 | Agrawal et al. |
| 6,714,929 | B1 | 3/2004 | Micaelian et al. |
| 6,718,324 | B2 | 4/2004 | Edlund et al. |
| 6,738,764 | B2 | 5/2004 | Mao et al. |
| 6,782,390 | B2 | 8/2004 | Lee et al. |
| 6,799,176 | B1 | 9/2004 | Page |
| 6,804,659 | B1 | 10/2004 | Graham et al. |
| 6,836,773 | B2 | 12/2004 | Tamayo et al. |
| 6,947,930 | B2 | 9/2005 | Anick et al. |
| 7,007,074 | B2 | 2/2006 | Radwin |
| 7,058,628 | B1 | 6/2006 | Page |
| 7,065,524 | B1 | 6/2006 | Lee |
| 7,089,194 | B1 | 8/2006 | Berstis et al. |
| 7,100,111 | B2 | 8/2006 | McElfresh et al. |
| 7,222,127 | B1 | 5/2007 | Bem et al. |
| 7,231,399 | B1 | 6/2007 | Bern et al. |
| 7,260,573 | B1 | 8/2007 | Jeh et al. |
| 7,305,389 | B2 | 12/2007 | Zeng et al. |
| 7,356,530 | B2 * | 4/2008 | Kim .......................... 707/709 |
| 7,398,271 | B1 * | 7/2008 | Borkovsky ....... G06F 17/30864 |
| 7,421,432 | B1 | 9/2008 | Hoelzle et al. |
| 7,451,130 | B2 | 11/2008 | Gupta et al. |
| 7,523,096 | B2 | 4/2009 | Badros et al. |
| 7,584,181 | B2 | 9/2009 | Zeng et al. |
| 7,716,225 | B1 | 5/2010 | Dean et al. |
| 2002/0083067 | A1 | 6/2002 | Tamayo et al. |
| 2002/0123988 | A1 | 9/2002 | Dean et al. |
| 2002/0184181 | A1 | 12/2002 | Agarwal et al. |
| 2003/0195877 | A1 | 10/2003 | Ford et al. |
| 2003/0197837 | A1 | 10/2003 | Gyu Lee |
| 2004/0088308 | A1 | 5/2004 | Bailey et al. |
| 2005/0071465 | A1 | 3/2005 | Zeng et al. |
| 2005/0071741 | A1 | 3/2005 | Acharya et al. |
| 2012/0095837 | A1 | 4/2012 | Bharat et al. |

OTHER PUBLICATIONS

Baeza-Yates et al. "Web Page Ranking using Link Attributes," WWW2004, May 17-22, 2004, New York.

Oztekin et al. "Usage Meets Link Analysis: Towards Improving Site Specific and Intranet Search via Usage Statistics," May 24, 2004.

Boyan et al.; "A Machine Learning Architecture for Optimizing Web Search Engines;" Carnegie Mellon University; May 10, 1996; pp. 1-8.

http://www.searchengines.com/directhit.html; "Click Popularity-DirectHit Technology Overview," Nov. 10, 2003 (print date); 2 pages.

http://www.httprevealer.com; "Creative Use of HttpRevealer—How does Google Toolbar Work?"; Apr. 19, 2004 (print date); pp. 1-6.

Friedman et al.; "Additive Logistic Regression: a Statistical View of Boosting"; Dept. of Statistics, Stanford University Technical Report; Aug. 20, 1998, 45 pages.

Crestani et al.; ""Is This Document Relevant?. . . Probably:" A Survey of Probabilistic Models in Information Retrieval;" ACM Computing Surveys, vol. 30, No. 4, Dec. 1998, pp. 528-552.

Wang et al. "Ranking Users Relevance to a Topic through Link Analysis on Web Logs," WIDM'02, Nov. 8, 2002, 6 pages.

Weis et al.: Rule-based Machine Learning Methods for Functional Prediction, Journal of AI Research, vol. 3, Dec. 1995, pp. 383-403.

Brin et al., "The Anatomy of a Large-scale Hypertextual Web Search Engine," Stanford University, 1998, 20 pages.

Xing et al., "Weighted PageRank Algorithm," CNSR'04, IEEE, May 19, 2004, 10 pages.

Ng et al.; "On Discriminative vs. Generative classifiers: A comparison of logistic regression and naive Bayes," in T. Dietterich, S. Becker and Z. Ghahramani (eds.), Advances in Neural Information Processing Systems 14, Cambridge, MA: MIT Press, 2002, 8 pages.

* cited by examiner

RANKING DOCUMENTS BASED ON USER BEHAVIOR AND/OR FEATURE DATA

RELATED APPLICATIONS

This application is a continuation of U.S. application Ser. No. 13/347,472, filed Jan. 10, 2012, which is a continuation of U.S. application Ser. No. 12/728,015, filed Mar. 19, 2010, now U.S. Pat. No. 8,117,209, which is a continuation of U.S. application Ser. No. 10/869,057, filed Jun. 17, 2004, now U.S. Pat. No. 7,716,225. The entire disclosures of these applications are incorporated herein by reference.

BACKGROUND

Field of the Invention

Systems and methods consistent with the principles of the invention relate generally to information retrieval and, more particularly, to creating a ranking function based on user behavior and/or feature data and using the ranking function to assign ranks to documents.

Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web documents in which a user is interested. The goal of the search engine is to provide links to high quality documents to the user. Identifying high quality documents can be a tricky problem and is made more difficult by spamming techniques.

SUMMARY

According to one aspect, a method may include generating a model based on user behavior data associated with a group of documents. The method may also include assigning weights to links based on the model, where the links may include references from first documents to second documents in a set of documents, and assigning ranks to the second documents based on ranks of the first documents and the weights assigned to the links.

According to another aspect, a system may include means for generating a model based on user behavior data relating to links in a group of documents and feature data associated with the links. The system may also include means for assigning weights to references in a set of documents based on the model and means for assigning ranks to documents in the set of documents based on the weights assigned to the references.

According to yet another aspect, a system may include a memory and a processor. The memory may store user behavior data relating to a group of documents and feature data associated with the documents. The processor may generate a model based on the user behavior data and the feature data, assign a weight to a link from a first document to a second document in a set of documents based on the model, and assign a rank to the second document based on a rank of the first document and the weight assigned to the link.

According to a further aspect, a method may include generating a model based on different types of feature data associated with a group of documents. The method may also include assigning a weight to a link from a first document in a set of documents to a second document in the set of documents based on the model and assigning a rank to the second document based on a rank of the first document and the weight assigned to the link.

According to another aspect, a method may include generating a model based on feature data relating to features of a linking document and a link associated with the linking document, where the linking document references a linked document via the link. The method may also include assigning a rank to a document based on the model.

According to yet another aspect, a method may include generating a model based on feature data relating to different features of a link from a linking document to a linked document and user behavior data relating to navigational actions associated with the link and assigning a rank to a document based on the model.

According to a further aspect, a method may include generating a model based on user behavior data and document feature data and assigning ranks to documents based on the model.

According to another aspect, a method may include determining a weight for a link from a linking document to a linked document based on feature data associated with at least one of the link, the linking document, or the linked document, and assigning a rank to at least one of the linking document or the linked document based on the determined weight for the link.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

A linked database may include documents with links among them. A "document," as the term is used herein, is to be broadly interpreted to include any machine-readable and machine-storable work product. A document may include, for example, an e-mail, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.).

A "link," as the term is used herein, is to be broadly interpreted to include any reference to/from a document from/to another document or another part of the same document. A "forward link" (sometimes referred to as an "outbound link") is used to refer to a link from a source document to a target document from the standpoint of the source document. A "backward link" (sometimes referred to as an "inbound link") is used to refer to a link from a target document to a source document from the standpoint of the source document.

Figure 1:
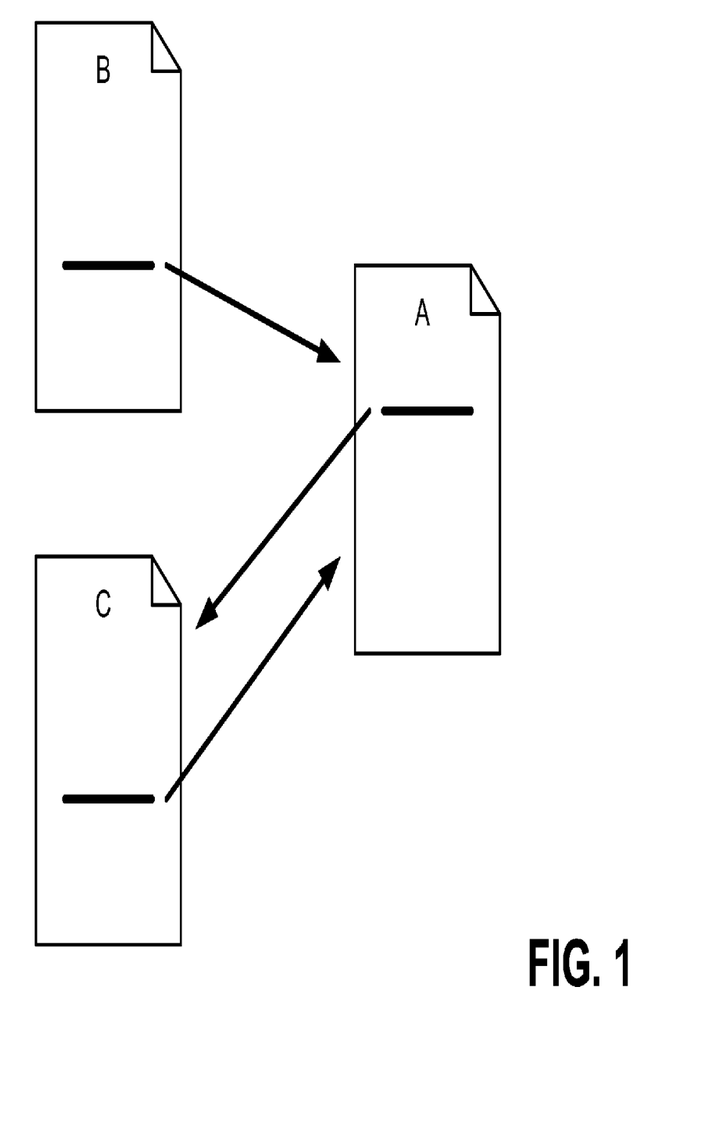
FIG. 1 is an exemplary diagram of a simple linked database.

FIG. 1 is an exemplary diagram of a simple linked database that includes three documents: document A, document B, and document C. As shown, document A includes a single forward link to document C and two backward links from documents B and C. Document B includes a single forward link to document A. Document C includes a single forward link to document A and a single backward link from document A.

Systems and methods consistent with the principles of the invention may provide a reasonable surfer model that indicates that when a surfer accesses a document with a set of links, the surfer will follow some of the links with higher probability than others. This reasonable surfer model reflects the fact that not all of the links associated with a document are equally likely to be followed. Examples of unlikely followed links may include "Terms of Service" links, banner advertisements, and links unrelated to the document.

Exemplary Information Retrieval Network

Figure 2:
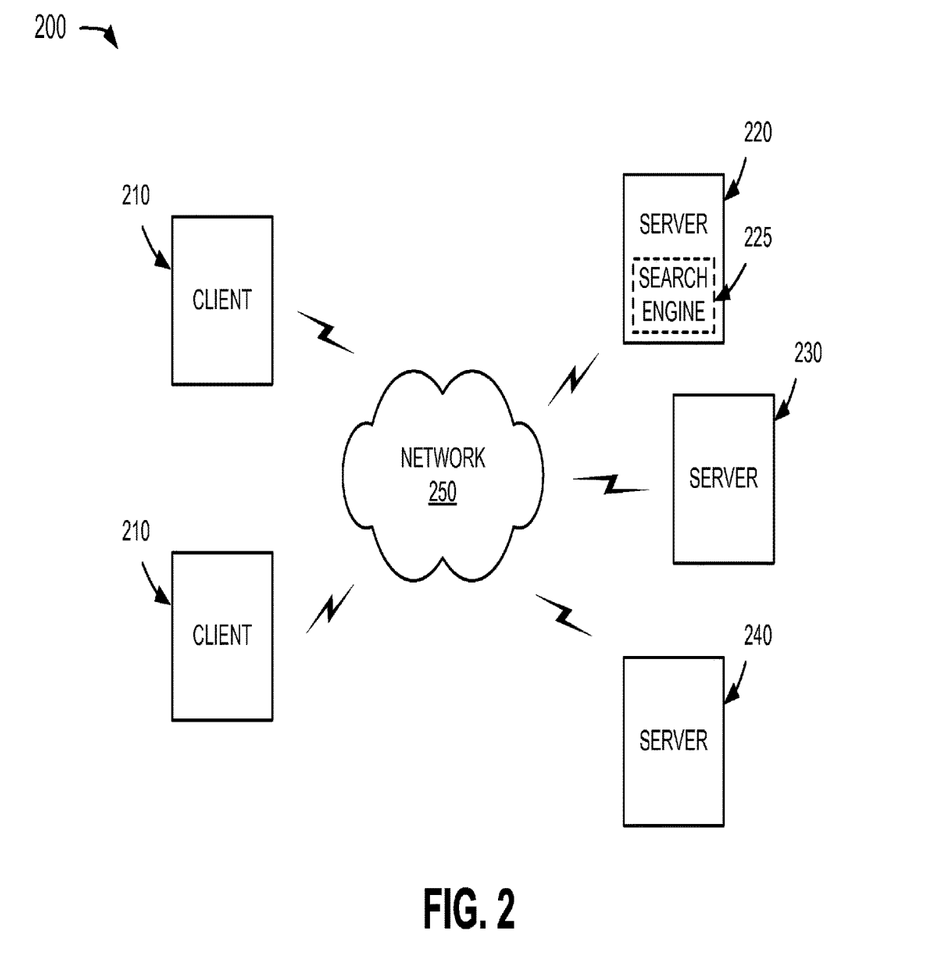
FIG. 2 is a diagram of an exemplary information retrieval network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Network 250 may include a local area network (LAN), a wide area network (WAN), a telephone network, such as the Public Switched Telephone Network (PSTN), an intranet, the Internet, a memory device, or a combination of networks. Two clients 210 and three servers 220-240 have been illustrated as connected to network 250 for simplicity. In practice, there may be more or fewer clients and servers. Also, in some instances, a client may perform the functions of a server and/or a server may perform the functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention. Clients 210 and servers 220-240 may connect to network 250 via wired, wireless, and/or optical connections.

In an implementation consistent with the principles of the invention, server 220 may include a search engine 225 usable by clients 210. Server 220 may crawl a corpus of documents (e.g., web pages), index the documents, and store information associated with the documents in a repository of crawled documents. Servers 230 and 240 may store or maintain documents that may be crawled by server 220. While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Exemplary Client/Server Architecture

Figure 3:
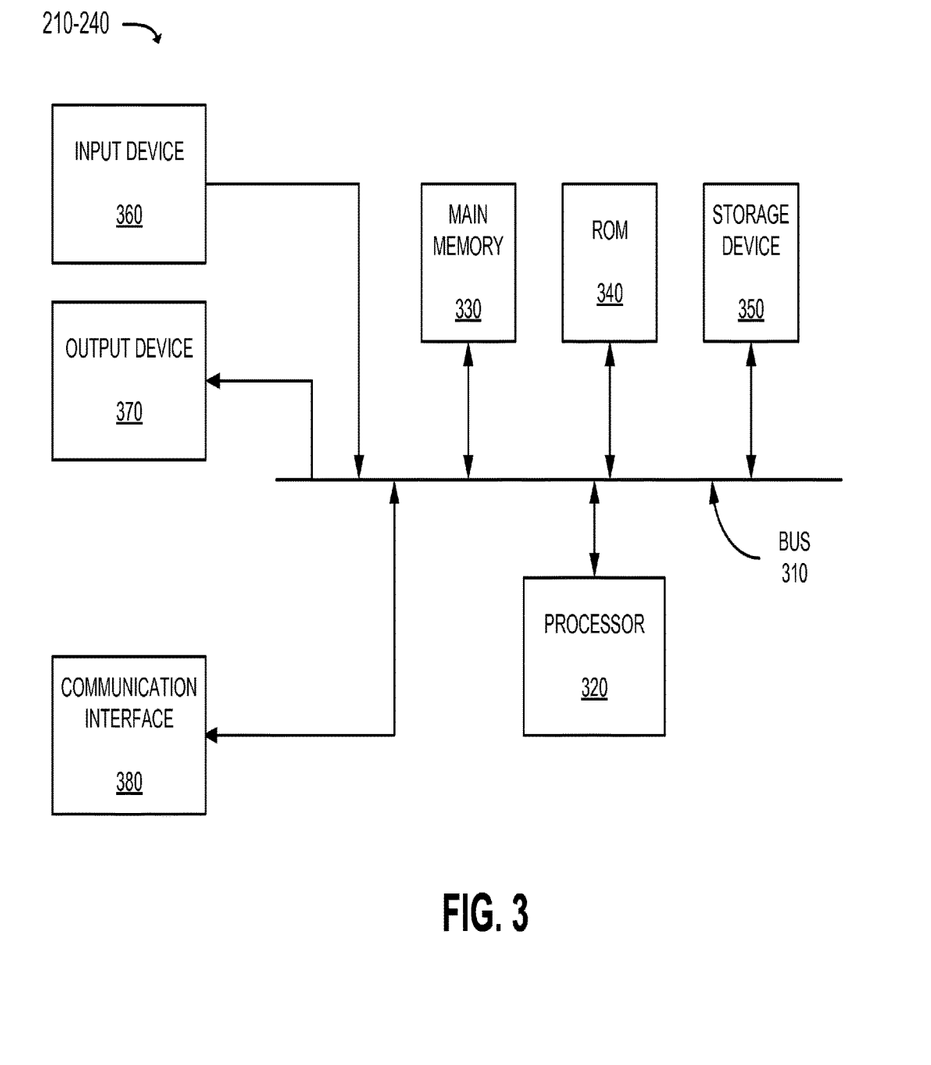
FIG. 3 is an exemplary diagram of a client or server according to an implementation consistent with the principles of the invention.

FIG. 3 is an exemplary diagram of a client or server entity (hereinafter called "client/server entity"), which may correspond to one or more of clients 210 and servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, performs certain searching-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Modeling System

Figure 4:
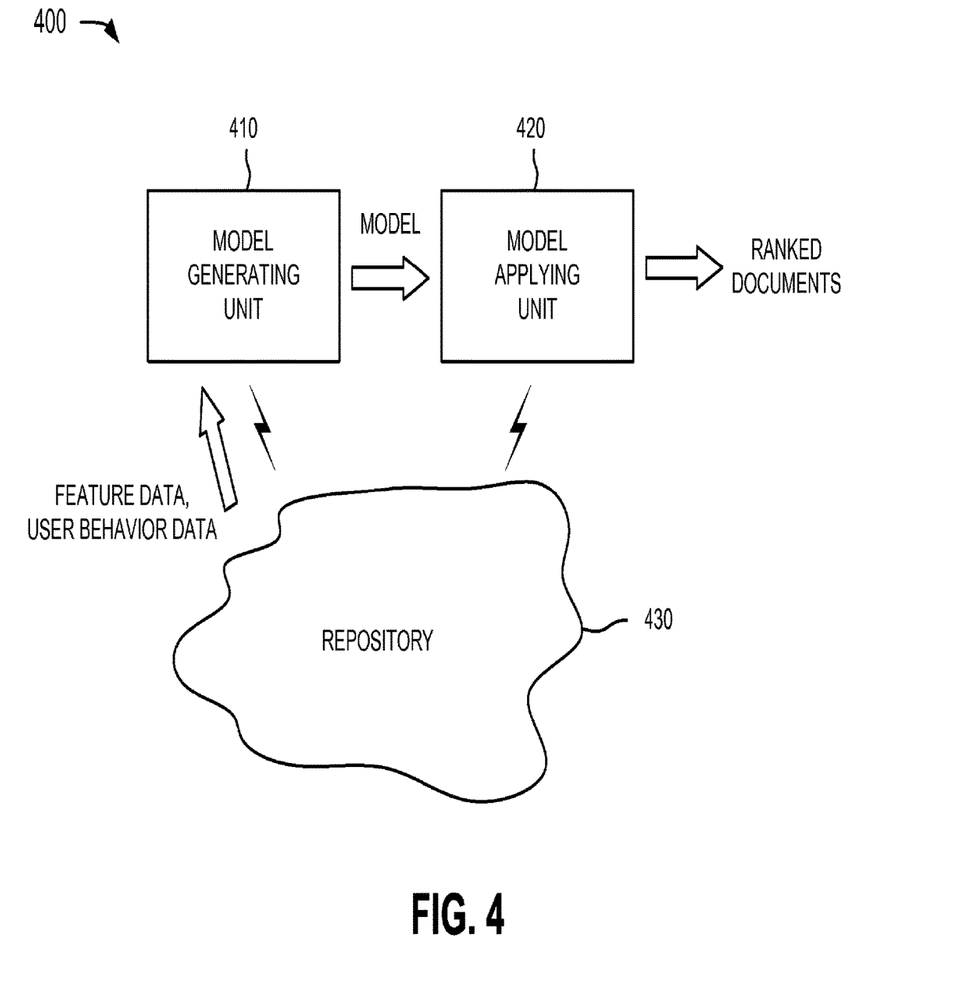
FIG. 4 is a functional block diagram of an exemplary modeling system according to an implementation consistent with the principles of the invention.

FIG. 4 is an exemplary functional block diagram of a modeling system 400 according to an implementation consistent with the principles of the invention. According to one implementation, one or more of the functions described below may be performed by server 220. According to another implementation, one or more of these functions may be performed by an entity separate from server 220, such as a computer associated with server 220 or one of servers 230 or 240.

Modeling system 400 may include model generating unit 410 and model applying unit 420 connected to a repository 430. Repository 430 may include a physical or logical memory device that stores information associated with documents that were crawled and indexed by, for example, server 220 (FIG. 2) or an entity separate from server 220. For example, repository 430 may store documents that form a linked database.

The document information may also, or alternatively, include feature data associated with features of documents ("source documents"), links in the source documents, and possibly documents pointed to by these links ("target documents"). Examples of features associated with a link might include the font size of the anchor text associated with the link; the position of the link (measured, for example, in a HTML list, in running text, above or below the first screenful viewed on an 800×600 browser display, side (top, bottom, left, right) of document, in a footer, in a sidebar, etc.); if the link is in a list, the position of the link in the list; font color and/or attributes of the link (e.g., italics, gray, same color as background, etc.); number of words in anchor text associated with the link; actual words in the anchor text associated with the link; commerciality of the anchor text associated with the link; type of the link (e.g., image link); if the link is associated with an image (i.e., image link), the aspect ratio of the image; the context of a few words before and/or after the link; a topical cluster with which the anchor text of the link is associated; whether the link leads somewhere on the same host or domain; if the link leads to somewhere on the same domain, whether the link URL is shorter than the referring URL; and/or whether the link URL embeds another URL (e.g., for server-side redirection). This list is not exhaustive and may include more, less, or different features associated with a link.

Examples of features associated with a source document might include the URL of the source document (or a portion of the URL of the source document); a web site associated with the source document; a number of links in the source document; the presence of other words in the source document; the presence of other words in a heading of the source document; a topical cluster with which the source document is associated; and/or a degree to which a topical cluster associated with the source document matches a topical cluster associated with anchor text of a link. This list is not exhaustive and may include more, less, or different features associated with a source document.

Examples of features associated with a target document might include the URL of the target document (or a portion of the URL of the target document); a web site associated with the target document; whether the URL of the target document is on the same host as the URL of the source document; whether the URL of the target document is associated with the same domain as the URL of the source document; words in the URL of the target document; and/or the length of the URL of the target document. This list is not exhaustive and may include more, less, or different features associated with a target document.

Repository 430 may also store user behavior data associated with documents. The user behavior data may include, for example, information concerning users who accessed the documents, such as navigational actions (e.g., what links the users selected, addresses entered by the users, forms completed by the users, etc.), the language of the users, interests of the users, query terms entered by the users, etc. In an alternate implementation, the user behavior data may be stored external to repository 430 and provided as an input to model generating unit 410.

The user behavior data might be obtained from a web browser or a browser assistant associated with clients 210. A browser assistant may include executable code, such as a plug-in, an applet, a dynamic link library (DLL), or a similar type of executable object or process that operates in conjunction with (or separately from) a web browser. The web browser or browser assistant might send information to server 220 concerning a user of a client 210.

For example, the web browser or browser assistant may record data concerning the documents accessed by the user and the links within the documents (if any) the user selected. Additionally, or alternatively, the web browser or browser assistant may record data concerning the language of the user, which may be determined in a number of ways that are known in the art, such as by analyzing documents accessed by the user. Additionally, or alternatively, the web browser or browser assistant may record data concerning interests of the user, which may be determined, for example, from the favorites or bookmark list of the user, topics associated with documents accessed by the user, or in other ways that are known in the art. Additionally, or alternatively, the web browser or browser assistant may record data concerning query terms entered by the user. The web browser or browser assistant may send this data for storage in repository 430.

In one implementation, repository 430 may also store data specific to certain classes of users. For example, repository 430 might store data corresponding to the language of a user class compared to the language of the source document and the language of the link and/or target document. Repository 430 might also/alternatively store data corresponding to a topical cluster associated with the interests of the user class compared to a topical cluster associated with the source and/or target documents. Repository 430 might also/alternatively store data corresponding to a set of query words associated with the user class compared to the content of the source and/or target documents.

Model generating unit 410 may determine link data for the various document links based on information stored in repository 430. The link data associated with a particular link might include how often the link was selected and the feature data associated with the link (including features associated with the link, the source document containing the link, and the target document referenced by the link). In one implementation, model generating unit 410 may analyze the user behavior data in repository 430 to generate positive and negative instances for the links. For example, model generating unit 410 may consider selection of a particular link in a document as a positive instance for that link and non-selection of the other links in the document as negative instances for those links. In the case where no links in a document are selected, model generating unit 410 may consider non-selection of the links as negative instances for the links.

To illustrate this, assume that a document W includes forward links to documents X, Y, and Z and the user behavior data indicates that the following selections occurred (W, X), (W, X), and (W, Z), where (W, X) means that the link from document W to document X was selected. In this case, three positive instances occurred: two for the link from W to X and one for the link from W to Z; and six negative instances occurred: one for the link from W to X, three for the link from W to Y, and two for the link from W to Z.

Model generating unit 410 may generate a feature vector for each of the links based on the link data. The feature vector associated with a link may be a function of the feature data associated with the link (including features associated with the link, the source document containing the link, and the target document referenced by the link). For example, the feature vector might indicate the font size of the anchor text associated with the link, the web site associated with the source document, the URL of the target document, and/or other feature data, as described above. The feature vector may take different forms.

Model generating unit 410 may then build a model of whether a link is likely to be selected based on the link's positive and negative instances, the link's associated feature vector, and possibly other information in repository 430. The model may be considered a dynamic model in that it is built from data that changes over time. Model generating unit 410 may use a conventional technique, such as a naive bayes, a decision tree, logistic regression, or a hand-tailored approach, to form the model.

The model may include general rules and document-specific rules. Model generating unit 410 may learn the general rules based on the user behavior data and the feature vector associated with the various links. For example, model generating unit 410 may determine how users behaved when presented with links with different associated feature data. From this information, model generating unit 410 may generate general rules of link selection.

For example, model generating unit 410 may generate a rule that indicates that links with anchor text greater than a particular font size have a higher probability of being selected than links with anchor text less than the particular font size. Additionally, or alternatively, model generating unit 410 may generate a rule that indicates that links positioned closer to the top of a document have a higher probability of being selected than links positioned toward the bottom of the document. Additionally, or alternatively, model generating unit 410 may generate a rule that indicates that when a topical cluster associated with the source document is related to a topical cluster associated with the target document, the link has a higher probability of being selected than when the topical cluster associated with the source document is unrelated to the topical cluster associated with the target document. These rules are provided merely as examples. Model generating unit 410 may generate other rules based on other types of feature data or combinations of feature data.

Model generating unit 410 may learn the document-specific rules based on the user behavior data and the feature vector associated with the various links. For example, model generating unit 410 may determine how users behaved when presented with links of a particular source document. From this information, model generating unit 410 may generate document-specific rules of link selection.

For example, model generating unit 410 may generate a rule that indicates that a link positioned under the "More Top Stories" heading on the cnn.com web site has a high probability of being selected. Additionally, or alternatively, model generating unit 410 may generate a rule that indicates that a link associated with a target URL that contains the word "domainpark" has a low probability of being selected. Additionally, or alternatively, model generating unit 410 may generate a rule that indicates that a link associated with a source document that contains a popup has a low probability of being selected. Additionally, or alternatively, model generating unit 410 may generate a rule that indicates that a link associated with a target domain that ends in ".tv" has a low probability of being selected. Additionally, or alternatively, model generating unit 410 may generate a rule that indicates that a link associated with a target URL that includes multiple hyphens has a low probability of being selected. These rules are provided merely as examples. Model generating unit 410 may generate other document-specific rules.

Model applying unit 420 may assign weights to links based on the dynamic model generated by model generating unit 410. The weight of a link may be a function of the rules applicable to the feature data associated with the link. A link's weight may reflect the probability that the link will be selected.

Model applying unit 420 may then assign ranks to documents based on the ranks of their linking documents (i.e., those documents with forward links to the documents), such as described in U.S. Pat. No. 6,285,999, entitled "METHOD FOR NODE RANKING IN A LINKED DATABASE," the contents of which are incorporated herein by reference. In implementations consistent with the principles of the invention, however, the document ranks are modified based on the dynamic weighting model described herein. For example, ranks for the documents may be generated according to the function:

$$r(A) = \frac{\alpha}{N} + (1-\alpha)\left(\frac{w_1 r(B_1)}{|B_1|} + \ldots \frac{w_n r(B_n)}{|B_n|}\right), \quad \text{Eqn. 1}$$

where A is a document for which a rank is being generated, $B_1, \ldots, B_n$ are documents connected by backward links to document A, $r(B_1), \ldots, r(B_n)$ are the ranks of the B documents, $w_1, \ldots, w_n$ are the weights assigned to the backward links, $|B_1|, \ldots, |B_n|$ are the number of forward links associated with the B documents, a is a constant in the interval [0, 1], and N is the total number of documents in the linked database. The rank of a document may be interpreted as the probability that a reasonable surfer will access the document after following a large number of forward links.

Model applying unit 420 may store the document ranks so that when the documents are later identified as relevant to a search query by a search engine, such as search engine 225, the ranks of the documents may be quickly determined. Since links periodically appear and disappear and user behavior data is constantly changing, model applying unit 420 may periodically update the weights assigned to the links and, thus, the ranks of the documents.

EXEMPLARY PROCESSING

Figure 5:
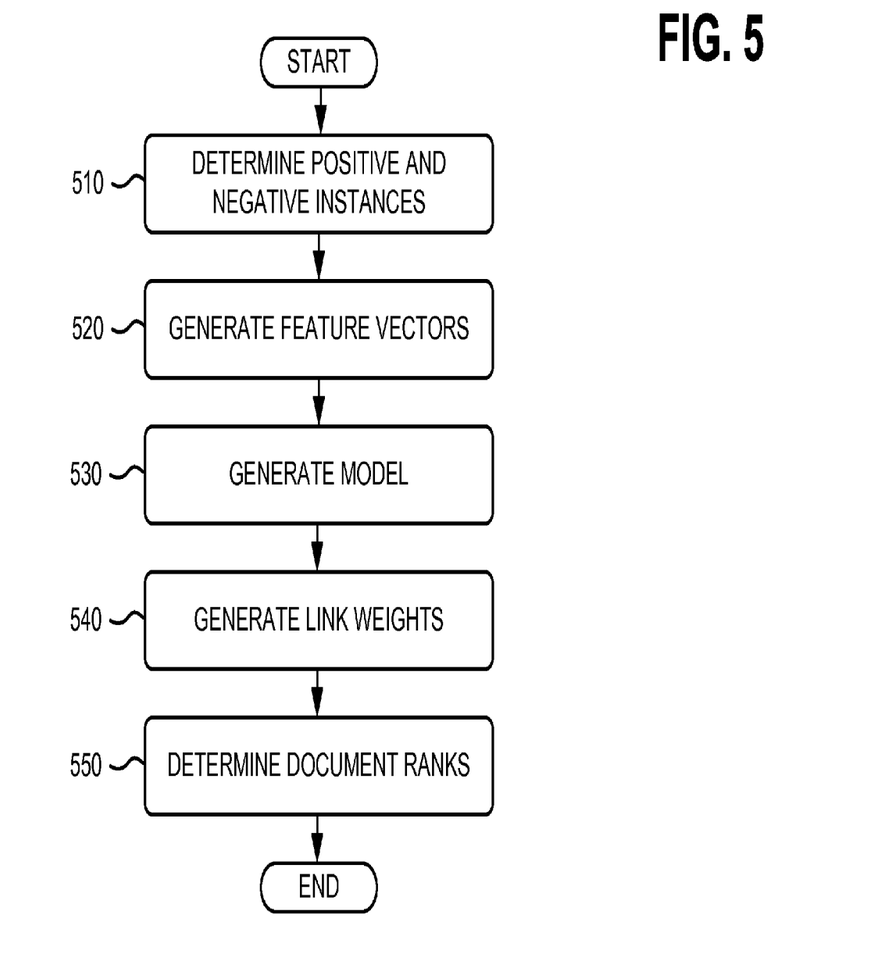
FIG. 5 is a flowchart of exemplary processing for determining document ranks according to an implementation consistent with the principles of the invention.

FIG. 5 is a flowchart of exemplary processing for determining document ranks according to an implementation consistent with the principles of the invention. Processing may begin with the storing of information, such as user behavior data and feature data, in a repository. As described above, documents maintained by servers connected to a network or a combination of networks, such as the Internet, may be crawled and indexed. User behavior data and feature data may also be determined for all or a subset of the documents. The user behavior data may include, for example, information concerning users who accessed the documents, such as navigational actions of the users, the language of the users, interests of the users, query terms entered by the users, etc. The feature data may include features associated with source documents, links in the source documents, and possibly target documents pointed to by the links. Examples of feature data have been provided above.

Positive and negative instances for the links may be determined based on information in the repository (act 510). For example, the user behavior data may be analyzed to determine which links were selected and which links were not selected. Selection of a link in a document may be identified as a positive instance for that link and non-selection of the other links in the document may be identified as negative instances for those links. Also, selection of no links in a document may be identified as negative instances for all of the links in the document.

Feature vectors may be generated for the links (act 520). The feature vector associated with a link may be a function of the feature data for the link. For example, the feature vector might include fields that provide feature data, such as the feature data described above, associated with the link.

A model may then be generated (act 530). The model may be generated based on the links' positive and negative instances, the links' associated feature vectors, and possibly other information in the repository. As described above, the model may include general rules and document-specific rules. The general rules are applicable across documents and the document-specific rules are applicable to specific documents.

Weights may be generated for links based on the model (act 540). The weight of a link may be a function of the rules applicable to the feature data associated with the link. A link's weight may reflect the probability that the link will be selected.

Document ranks may then be determined based on the link weights (act 550). One possible function for determining the rank of a document has been described above in Eqn. 1. The rank of a document may be interpreted as the probability that a reasonable surfer will access the document after following a number of forward links.

Figure 6:
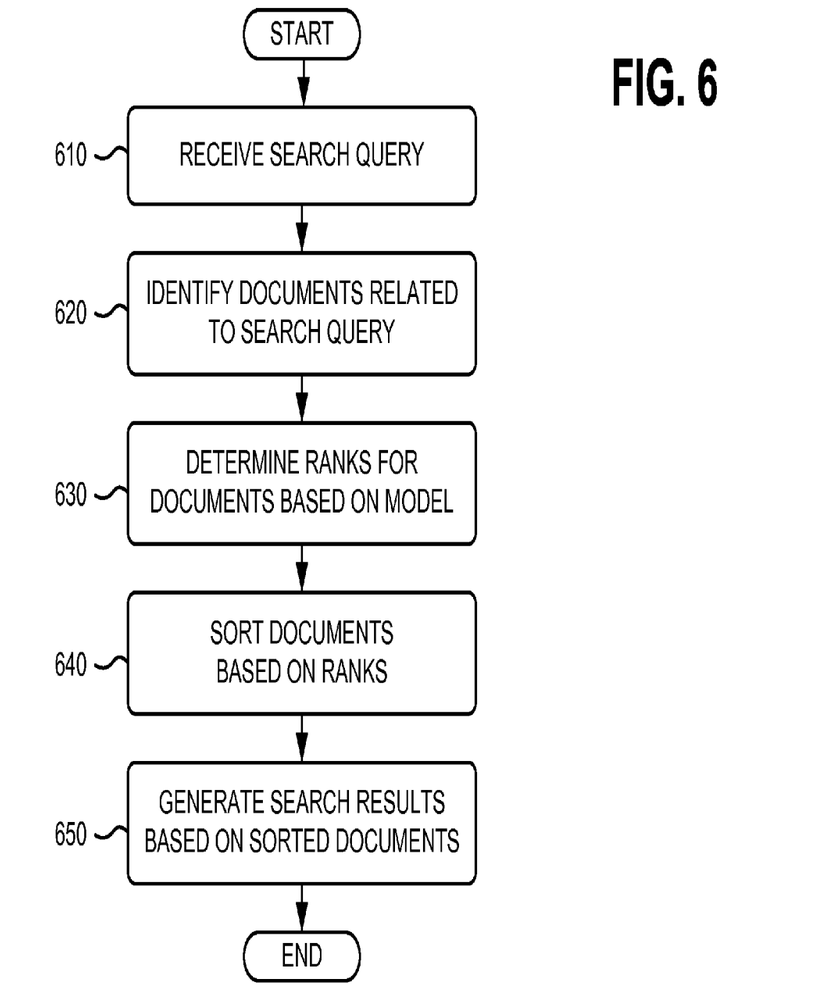
FIG. 6 is a flowchart of exemplary processing for presenting search results according to an implementation consistent with the principles of the invention.

FIG. 6 is a flowchart of exemplary processing for presenting search results according to an implementation consistent with the principles of the invention. Processing may begin with a user providing search terms as a search query for searching a document corpus. In one implementation, the document corpus includes documents available from the Internet and the vehicle for searching this corpus is a search engine, such as search engine 225 (FIG. 2). The user may provide the search query via web browser software on a client, such as client 210 (FIG. 2).

The search query may be received by the search engine and used to identify documents (e.g., web pages) related to the search query (acts 610 and 620). A number of techniques exist for identifying documents related to a search query. One such technique might include identifying documents that contain the search terms as a phrase. Another technique might include identifying documents that contain the search terms, but not necessarily together. Other techniques might include identifying documents that contain less than all of the search terms, or synonyms of the search terms. Yet other techniques are known to those skilled in the art.

Ranks may be determined for the identified documents based on the model (act 630). In one implementation, document ranks are pre-calculated and determining the ranks of the documents may include simply looking up the document ranks. In another implementation, the document ranks are not pre-calculated. In this case, the ranks of the documents can be determined based on the model rules, as described above with regard to the processing of FIG. 5.

The documents may then be sorted based on their ranks (act 640). In practice, however, a document's rank may be one of several factors used to determine an overall rank for the document. The documents may then be sorted based on their overall ranks.

Search results may be formed based on the sorted documents (act 650). In an implementation consistent with the principles of the invention, the search results may include links to the documents, possibly including a textual description of the links. In another implementation, the search results may include the documents themselves. In yet other implementations, the search results may take other forms.

The search results may be provided as a HTML document, similar to search results provided by conventional search engines. Alternatively, the search results may be provided according to a protocol agreed upon by the search engine and the client (e.g., Extensible Markup Language (XML)).

EXAMPLE

Figure 7:
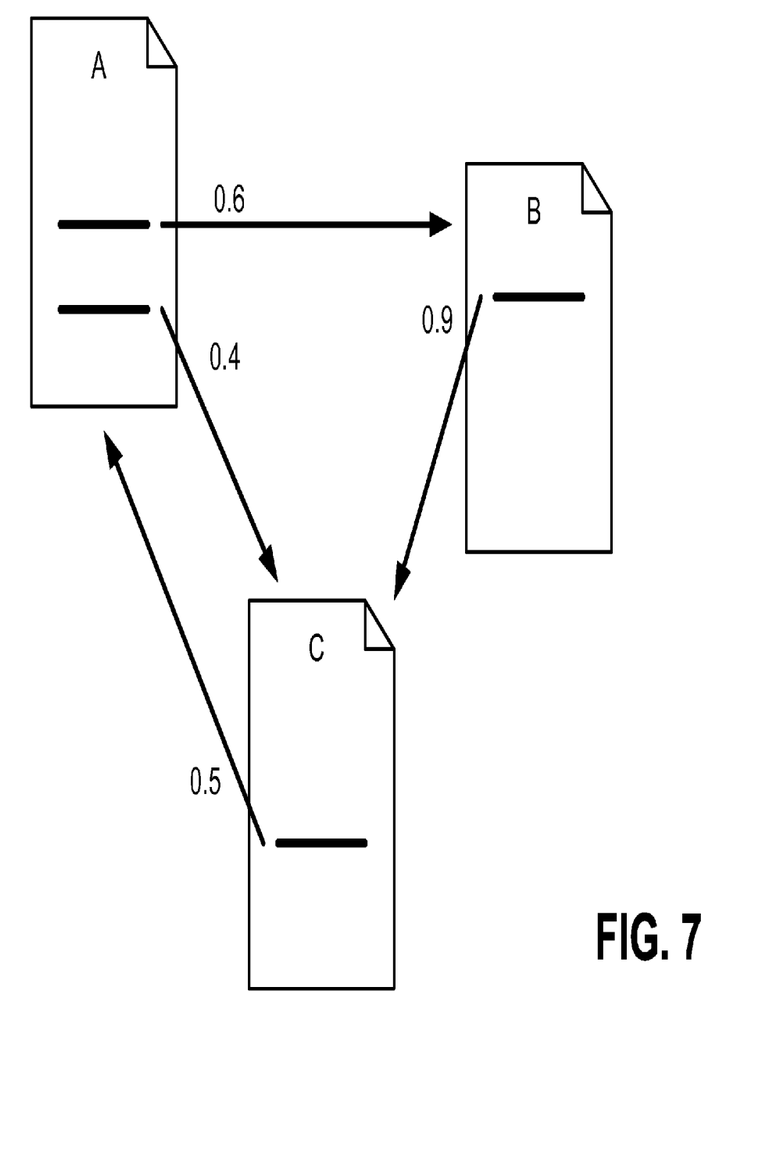
FIG. 7 is a diagram of an exemplary linked database.

FIG. 7 is a diagram of an exemplary linked database that includes three documents: document A, document B, and document C. As shown, document A includes two forward links to documents B and C and a single backward link from document C. Document B includes a single forward link to document C and a single backward link from document A. Document C includes a single forward link to document A and two backward links from documents A and B.

Assume that the backward link from document C to document A has an associated weight of 0.5, the backward link from document A to document B has an associated weight of 0.6, the backward link from document B to document C has an associated weight of 0.9, and the backward link from document A to document C has an associated weight of 0.4. The weights for these backward links may be determined based on the user behavior data and feature data associated with the links, as described above. While a typical value for a is 0.1, assume that a is 0.5 for this example.

Based on Eqn. 1, the ranks of documents A-C may be determined as follows:

$$r(A) = \frac{1}{6} + \frac{1}{4}r(C),$$

$$r(B) = \frac{1}{6} + \frac{3}{20}r(A), \text{ and}$$

$$r(C) = \frac{1}{6} + \frac{1}{10}r(A) + \frac{9}{20}r(B).$$

The solution in this case is r(A)≈0.237, r(B)≈0.202, and r(C)≈0.281.

CONCLUSION

Systems and methods consistent with the principles of the invention may determine ranks for documents based on the ranks of linking documents (i.e., those documents with forward links to the documents) and a dynamic link weighting model. The model may be used to adjust the contribution that various links make in the ranking process.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5 and 6, the order of the acts may be modified in other implementations consistent with the principles of the invention. Further, non-dependent acts may be performed in parallel.

In one implementation, server 120 may perform most, if not all, of the acts described with regard to the processing of FIGS. 5 and 6. In another implementation consistent with the principles of the invention, one or more, or all, of the acts may be performed by another entity, such as another server 130 and/or 140 or client 110.

It has been described that ranks are determined for documents based on user behavior data. According to one implementation, the user behavior data is associated with a set of users. According to another implementation, the user behavior data is associated with a subset, or class, of users. In this case, the weights assigned to the links may be tailored to the user class. According to yet another implementation, the user behavior data is associated with a single user. In this case, the weights assigned to the links may be tailored to the user.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
generating, by one or more server devices, a measure indicating a probability that links associated with particular feature data will be selected, the particular feature data identifying one or more link features associated with the links, wherein generating the measure comprises:
identifying link selection data for a plurality of documents collectively having corresponding links, of the links associated with the particular feature data, wherein each of the plurality of documents each has a corresponding link of the corresponding links, wherein the corresponding links collectively link to a plurality of target documents and each of the corresponding links is to a corresponding one of the plurality of target documents, the link selection data indicating:
a quantity of selections of the corresponding links of the plurality of documents, the selections each being based on a respective one of a plurality of user devices accessing a respective one of the documents and selecting the corresponding link of the respective one of the documents of the plurality of documents, and
generating, based on the link selection data, the measure indicating the probability that links associated with the particular feature data will be selected;
after generating the measure: generating, by one or more of the server devices, a rank for a particular document, wherein generating the rank comprises:
determining that a particular link to the particular document is associated with the particular feature data,
determining a weight of the particular link based on the measure, wherein determining the weight based on the measure is based on determining that the particular link is associated with the particular feature data, and
generating the rank for the particular document based on the weight for the particular link, and based on additional weights for additional links to the particular document;
identifying, by one or more of the server devices, documents associated with a search query, the documents, associated with the search query, including the particular document; and
providing, by the one or more server devices, information associated with the particular document based on:
the search query, and
the generated rank for the particular document.

2. The method of claim 1, further comprising:
identifying, from memory associated with the one or more server devices, additional link selection data for a plurality of additional documents each having a corresponding additional link associated with additional particular feature data,
the additional particular feature data identifying one or more additional link attributes of the corresponding additional links, and
the additional link selection data indicating an additional quantity of additional user device selections of the corresponding additional links of the documents;
wherein generating the measure comprises generating the measure based on the link selection data and the additional link selection data.

3. The method of claim 2, wherein the additional particular feature data identifies one or more additional link features of the corresponding additional links.

4. The method of claim 2, wherein the particular feature data identifies the one or more link features associated with the links and identifies features of source documents containing the links or features of the target documents referenced by the links.

5. The method of claim 1, wherein generating the rank for the particular document further comprises:
determining that the particular link to the particular document is associated with additional particular feature data;

identifying an additional measure indicating an additional probability that links associated with the additional particular feature data will be selected; and determining the weight of the particular link based on the measure and the additional measure, wherein determining the weight based on the measure and the additional measure is based on the particular link having the particular feature data and having the additional particular feature data.

6. The method of claim 1, wherein the one or more link features identify at least one of: context relating to one or more words before or after the links; words in anchor text associated with the links; and a quantity of the words in the anchor text.

7. The method of claim 6, wherein the one or more link features identify each of: context relating to one or more words before or after the links; words in anchor text associated with the links; and a quantity of the words in the anchor text.

8. The method of claim 1, wherein the particular feature data comprises features embodied by the links and identifies features of source documents containing the links or features of the target documents referenced by the links.

9. The method of claim 8, wherein the particular feature data identifies the one or more link features, identifies features of the source documents containing the links, and identifies features of the target documents referenced by the links.

10. The method of claim 1, further comprising:
sorting information regarding the documents based on ranks associated with the documents; and
providing the sorted information regarding the documents,
where providing the sorted information regarding the documents includes providing the information associated with the particular document.

11. One or more devices comprising:
one or more memories to store instructions; and
one or more processors to execute the instructions to:
generate a measure indicating a probability that links associated with particular feature data will be selected, the particular feature data identifying one or more link features associated with the links, wherein when generating the measure, the one or more of the processors are to:
identify link selection data for a plurality of documents collectively having corresponding links, of the links associated with the particular feature data, wherein each of the plurality of documents each has a corresponding link of the corresponding links, wherein the corresponding links collectively link to a plurality of target documents and each of the corresponding links is to a corresponding one of the plurality of target documents, the link selection data indicating:
a quantity of selections of the corresponding links of the plurality of documents, the selections each being based on a respective one of a plurality of user devices accessing a respective one of the documents and selecting the corresponding link of the respective one of the documents of the plurality of documents, and
generating, based on the link selection data, the measure indicating the probability that links associated with the particular feature data will be selected;
after generating the measure: generate a rank for a particular document, wherein when generating the rank, the one or more of the processors are to:

determine that a particular link to the particular document is associated with the particular feature data,
determine a weight of the particular link based on the measure, wherein determining the weight based on the measure is based on determining that the particular link is associated with the particular feature data, and
generate the rank for the particular document based on the weight for the particular link, and based on additional weights for additional links to the particular document;
identify documents associated with a search query, the documents, associated with the search query, including the particular document; and
provide information associated with the particular document based on:
the search query, and
the generated rank for the particular document.

12. The one or more devices of claim 11, wherein the one or more processors are further to:
identify, from memory associated with the one or more processors, additional link selection data for a plurality of additional documents each having a corresponding additional link associated with additional particular feature data,
the additional particular feature data identifying one or more additional link attributes of the corresponding additional links, and
the additional link selection data indicating an additional quantity of additional user device selections of the corresponding additional links of the documents;
wherein when generating the measure, the one or more processors are further to:
generate the measure based on the link selection data the additional link selection data.

13. The one or more devices of claim 12, wherein the additional particular feature data identifies one or more additional link features of the corresponding additional links.

14. The one or more devices of claim 12, wherein the particular feature data identifies the one or more link features associated with the links and identifies features of source documents containing the links or features of the target documents referenced by the links.

15. The one or more devices of claim 11, wherein when generating the rank for the particular document, the one or more processors are further to:
determine that the particular link to the particular document is associated with additional particular feature data;
identify an additional measure indicating an additional probability that links associated with the additional particular feature data will be selected; and
determine the weight of the particular link based on the measure and the additional measure, wherein determining the weight based on the measure and the additional measure is based on the particular link having the particular feature data and having the additional particular feature data.

16. The one or more devices of claim 11, wherein the one or more link features identify at least one of: context relating to one or more words before or after the links; words in anchor text associated with the links; and a quantity of the words in the anchor text.

17. The one or more devices of claim 16, wherein the one or more link features identify each of: the context relating to the one or more words before or after the links; the words in the anchor text associated with the links; and the quantity of the words in the anchor text.

18. The one or more devices of claim 11, wherein the particular feature data comprises features of the links and identifies features of source documents containing the links or features of the target documents referenced by the links.

19. The one or more devices of claim 11, wherein the one or more processors are further to:
   sort information regarding the documents based on ranks associated with the documents; and
   provide the sorted information regarding the documents, where providing the sorted information regarding the documents includes providing the information associated with the particular document.

20. A non-transitory computer-readable medium storing instructions, the instructions comprising:
   a plurality of instructions which, when executed by one or more devices, cause the one or more devices to:
      generate a measure indicating a probability that links associated with particular feature data will be selected, the particular feature data identifying one or more link features associated with the links, wherein when generating the measure, the one or more devices are to:
         identify link selection data for a plurality of documents collectively having corresponding links, of the links associated with the particular feature data, wherein each of the plurality of documents each has a corresponding link of the corresponding links, wherein the corresponding links collectively link to a plurality of target documents and each of the corresponding links is to a corresponding one of the plurality of target documents, the link selection data indicating:
            a quantity of selections of the corresponding links of the plurality of documents, the selections each being based on a respective one of a plurality of user devices accessing a respective one of the documents and selecting the corresponding link of the respective one of the documents of the plurality of documents, and
         generate, based on the link selection data, the measure indicating the probability that links associated with the particular feature data will be selected;
      after generating the measure: generate a rank for a particular document, wherein when generating the rank one or more of the devices are to:
         determine that a particular link to the particular document is associated with the particular feature data,
         determine a weight of the particular link based on the measure, wherein determining the weight based on the measure is based on determining that the particular link is associated with the particular feature data, and
         generate the rank for the particular document based on the weight for the particular link, and based on additional weights for additional links to the particular document;
      identify documents associated with a search query, the documents, associated with the search query, including the particular document; and
      provide information associated with the particular document based on:
         the search query, and
         the generated rank for the particular document.

* * * * *